US008713208B2

(12) United States Patent
Kang et al.

(10) Patent No.: US 8,713,208 B2
(45) Date of Patent: *Apr. 29, 2014

(54) IMAGE DISPLAY DEVICE AND METHOD OF CHANGING FIRST EDID WITH SECOND EDID WHEREIN THE SECOND EDID INFORMATION IS COMPATIBLE WITH IMAGE DISPLAY DEVICE

(75) Inventors: Ho-woong Kang, Yongin-si (KR); Ii-doo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1434 days.

This patent is subject to a terminal disclaimer.

(21) Appl. No.: 12/140,462

(22) Filed: Jun. 17, 2008

(65) Prior Publication Data

US 2009/0091665 A1 Apr. 9, 2009

(30) Foreign Application Priority Data

Oct. 9, 2007 (KR) .......................... 10-2007-0101584

(51) Int. Cl.
*G06F 5/00* (2006.01)
*G06F 13/00* (2006.01)

(52) U.S. Cl.
USPC .......... 710/10; 710/8; 710/9; 710/16; 710/17; 710/18; 710/19; 713/1; 713/2; 345/1.1; 345/1.3; 345/581

(58) Field of Classification Search
USPC .......... 710/8–10, 16–19; 713/1, 2; 345/5, 156
See application file for complete search history.

(56) References Cited

U.S. PATENT DOCUMENTS

| 7,366,886 B2 * | 4/2008 | Yoo .................................... 713/1 |
| 2005/0080939 A1 | 4/2005 | Onuma et al. |
| 2005/0120384 A1 * | 6/2005 | Stone et al. .................... 725/132 |
| 2008/0198128 A1 * | 8/2008 | Tsai et al. ...................... 345/156 |
| 2008/0309584 A1 * | 12/2008 | Zhang ............................. 345/5 |

FOREIGN PATENT DOCUMENTS

| EP | 1659565 | 5/2006 |
| EP | 08165357.8-2205 | 9/2008 |

OTHER PUBLICATIONS

Extended European Search Report Issued Sep. 2, 2010 in EP Application No. 08165357.8.
Disclosed Anonymously: "Display switch with dedicated extended display identification data information" Research Disclosure, Mason Publications, Hamshire, GB, vol. 508, No. 89, Aug. 1, 2006, p. 1092, XP007136552.

* cited by examiner

*Primary Examiner* — Tammara Peyton
(74) *Attorney, Agent, or Firm* — Stanzione & Kim, LLP

(57) ABSTRACT

A display apparatus connected to a video/audio output device includes at least two connecting portions to connect with the video/audio output device, a first storage unit to store extended display identification data (EDID) information to be provided to the video/audio output device, a second storage unit to store EDID information corresponding to the two connecting portions respectively, and a controller to change the EDID information stored in the first storage unit into one information of a currently connected connecting portion among the EDID information stored in the second storage unit when the connecting portion connected with the video/audio output device is changed.

13 Claims, 3 Drawing Sheets

IMAGE DISPLAY DEVICE AND METHOD OF CHANGING FIRST EDID WITH SECOND EDID WHEREIN THE SECOND EDID INFORMATION IS COMPATIBLE WITH IMAGE DISPLAY DEVICE

CROSS-REFERENCE TO RELATED APPLICATIONS

This application claims priority under 35 U.S.C 119(a) from Korean Patent Application No. 10-2007-0101584, filed on, Oct. 9, 2007 in the Korean Intellectual Property Office, the disclosure of which is incorporated herein in its entirety by reference.

BACKGROUND OF THE INVENTION

1. Field of the Invention

The present general inventive concept relates to a display apparatus and a method of changing EDID information thereof, more particularly, to a method of efficiently changing EDID information of a display apparatus when a video/audio output device is connected to a connecting portion of the display apparatus with a plurality of connecting portions.

2. Description of the Related Art

A conventional display apparatus which outputs video and audio signals, such as a TV and a monitor, may be used in connection with a video/audio output device, such as a set-top box, DVD player, and personal computer (PC). When the conventional display apparatus is connected with the video/audio output device, the video/audio output device provides a video signal to the display apparatus and the video signal is output on a screen of the display apparatus. The video/audio output device further provides an audio signal to the display apparatus, and the audio signal is output through the speaker of the display apparatus.

FIG. 1 is a block diagram of a conventional image display system 1.

When source signals, i.e., video and/or audio signals, are output using the image display system 1 illustrated in FIG. 1, video/audio output units 11, 21, and 31 of video/audio output device 10, 20, and 30 produce a source signal and transmit it to a display apparatus through connecting units 13, 23, and 33. The display apparatus 100 outputs the source signal through a video/audio signal processor 140 and an output unit 160 according to the control of the controller 150.

If the video/audio output devices 10, 20, and 30 are connected with the display apparatus 100 via a predetermined cable, controllers 12, 22, and 32 thereof determine an output signal suitable for the display apparatus 100 according to an optimal condition with reference to extended display identification data (EDID) information stored in non-volatile memories 110, 120, and 130 of the display apparatus 100. Here, the EDID information refers to data information including IDs of a seller and producer, basic display variations and characteristics, or the like.

For example, when a TV is connected to a PC, the PC senses the EDID information of the TV according to the definition of a Plug & Play function to output a video and/or audio signal suitable for the TV.

Thus, the display apparatus 100 is required to store standardized EDID information suitable for the display apparatus 100 in the non-volatile memories 110, 120, and 130 at the manufacturing process so that the video/audio output devices 10, 20, and 30 sense the EDID information of the display apparatus 100. Here, each of the non-volatile memories 110, 120, and 130 is provided for every connecting portion to store EDID information suitable for each of the connecting portions.

However, as the practical application of video and audio signals is expanded in addition to technical advances in display apparatus 100 and video/audio output devices 10, 20, and 30, the display apparatus is required to have more connecting portions. When more connecting portions are used, more non-volatile memories storing EDID information are necessary. Accordingly, cost of materials increases, and the manufacturing process and production time are extended.

SUMMARY OF THE INVENTION

The present general inventive concept provides a display apparatus including a plurality of connecting portions and a non-volatile memory to store EDID information corresponding to the connecting portions to efficiently provide EDID information to a video/audio output device using two non-volatile memories, and a method of changing the EDID information thereof.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept are achieved by providing a display apparatus connectable to a video/audio output device, comprising at least two connecting portions to connect with the video/audio output device, a first storage unit to store extended display identification data (EDID) information to be provided to the video/audio output device, a second storage unit to store EDID information corresponding to the two connecting portions respectively, and a controller to change the EDID information stored in the first storage unit into information of a currently connected connecting portion among the EDID information stored in the second storage unit when the connecting portion connected with the video/audio output device is changed.

The display apparatus may further comprise a switch unit to selectively connect the two connecting portions to the first storage unit, wherein the switch unit disconnects the connecting portions with the first storage unit when input with a signal requesting to change the EDID information from the controller, and reconnects the connecting portions with the first storage unit when completely changing the EDID information.

The two connecting portions may comprise a video/audio output device connection sensing switch unit, and the controller senses an interface signal of the connection sensing switch unit coupled to the two connecting portions to determine a connecting portion connected to the video/audio output device.

The controller may determine whether there are video signals of the two connecting portions to decide a connecting portion connected to the video/audio device.

The display apparatus may further comprise a user interface to provide a list of connected connecting portions in a selectable form and to receive a connecting portion selection input signal from a user when at least two video/audio output devices are connected to the two connecting portions.

The foregoing and/or other aspects and utilities of the present general inventive concept can be achieved by providing a method of changing extended display identification data (EDID) information of an display apparatus which comprises at least two connecting portions to connect with a video/audio output device, comprising determining a connecting portion connected to the video/audio output device among two connecting portions, and changing the EDID information stored in a first storage unit and provided when connected with the video/audio output device into an EDID information corresponding to the connected connecting portion among EDID information stored in a second storage unit and respectively corresponding to the two connecting portions.

The method may further comprise disconnecting the connecting portion with the first storage unit before changing the EDID information, and reconnecting the connecting portion with the first storage unit after changing the EDID information.

The method may further comprise providing a list of connecting portions in a selectable form when at least two video/audio output devices are connected to the two connecting portions, and inputting user's selection about the connecting portions, wherein the changing the EDID information is carried out by changing the EDID information stored in the first storage unit into EDID information of a connecting portion by the user's selection among EDID information stored in the second storage unit.

The foregoing and/or other aspects and utilities of the present general inventive concept can be achieved by providing a display apparatus comprising a plurality of connecting portions to connect with a video/audio output device, a signal processor to process a video/audio signal input from the video/audio output device, a first storage unit to store extended display identification data (EDID) information provided to the video/audio output device when the video/audio output device is connected with the connecting portions, a second storage unit to store a plurality of EDID information respectively corresponding to the plurality of connecting portions, and a controller to store EDID information corresponding to a connecting portion connected with the video/audio output device among a plurality of EDID information of the second storage unit in the first storage unit when the video/audio output device is connected to one of the connecting portions.

The foregoing and/or other aspects and utilities of the present general inventive concept may also be achieved by providing an image display system, comprising a display apparatus to display images thereon, comprising a first storage unit to store a plurality of extended display identification data (EDID) information of the display apparatus, and a second storage unit to store one of the plurality of EDID information, and a plurality of video/audio output devices to sense the EDID information stored in the second storage unit and to selectively output video/audio signals to the display apparatus according to the sensed EDID information.

The image display system may further comprise a controller to change the EDID information stored in the second storage unit to another one of the plurality of EDID information stored in the first storage unit.

The image display system may further comprise a switch to disconnect the plurality of video/audio output devices from the display apparatus when a signal is sent to the controller to change the EDID information stored in the second storage unit.

The image display system may further comprise a user interface unit to allow a user to select one of the plurality of video/audio output devices.

The image display system may further comprise a video/audio signal processor to decode the selectively output video/audio signals, and an output unit to output the decoded video/audio signals.

The video/audio signals output to the display apparatus contain information to allow the display apparatus to produce corresponding images and sounds.

The image display system may further comprise an output unit to output the images and sounds corresponding to the video/audio signals output by the plurality of video/audio output devices.

The foregoing and/or other aspects and utilities of the present general inventive concept may also be achieved by providing an image display system including a display apparatus, comprising a plurality of video/audio output devices to selectively output video/audio signals to the display apparatus, a plurality of connection portions to connect a respective one of the plurality of video/audio output devices to the display apparatus, a first storage unit to store extended display identification data (EDID) information of one of the plurality of connecting portions, such that one of the respective video/audio output devices outputs the video/audio signals to the display apparatus, a second storage unit to store EDID information of all of the plurality of connecting portions, and a controller to change the EDID information stored in the first storage unit to another one of the EDID information stored in the second storage unit to selectively allow another one of the respective video/audio output devices to output the video/audio signals to the display apparatus.

The image display system may further comprise a user interface unit to allow a user to select one of the plurality of connection portions from a list of the plurality of connection portions.

The image display system may further comprise a switch to disconnect the plurality of connection portions from the display apparatus during the changing of the EDID information.

The foregoing and/or other aspects and utilities of the present general inventive concept may also be achieved by providing a method of controlling an image display system including a display apparatus, the method comprising storing a plurality of extended display identification data (EDID) information of the display apparatus in a first storage unit, such that the plurality of EDID information corresponds to a plurality of respective video/audio output devices, storing one of the plurality of EDID information of the display apparatus in a second storage unit, and outputting video/audio signals from one of the plurality of respective video/audio output devices to the display apparatus based on the EDID information stored in the second storage unit.

The method may further comprise changing the EDID information stored in the second storage unit to another one of the plurality of EDID information stored in the first storage unit in order to allow another one of the plurality of respective video/audio output devices to output video/audio signals to the display apparatus.

The method may further comprise changing the EDID information stored in the second storage unit to another one of the plurality of EDID information stored in the first storage unit.

The method may further comprise disconnecting the plurality of video/audio output devices from the display apparatus during the changing of the EDID information.

The foregoing and/or other aspects and utilities of the present general inventive concept may also be achieved by providing a method of changing extended display identification data (EDID) information of a display apparatus connected to a plurality of video/audio output devices via a plurality of respective connection portions, the method comprising storing EDID information of one of the plurality of connecting portions in a first storage unit, such that one of the respective video/audio output devices outputs the video/audio signals to the display apparatus, storing EDID information of all of the plurality of connecting portions in a second storage unit, changing the EDID information stored in the first storage unit to another one of the EDID information stored in the second storage unit based on a user's request to selectively allow another one of the respective video/audio output devices to output the video/audio signals to the display apparatus, and outputting video/audio signals to the display apparatus based on the changed EDID information.

The method may further comprise decoding the output video/audio signals, and outputting the decoded video/audio signals.

BRIEF DESCRIPTION OF THE DRAWINGS

The above and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
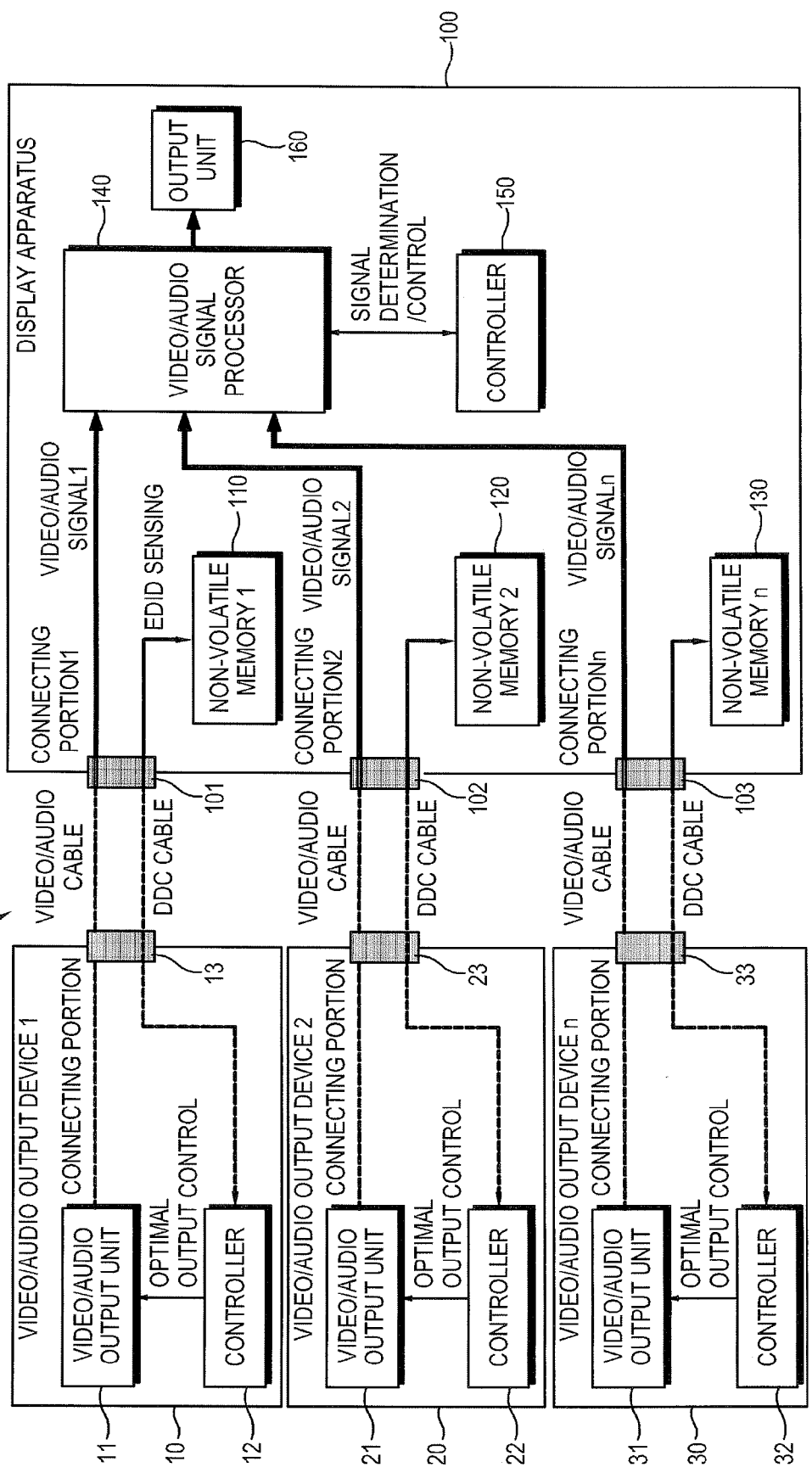
FIG. 1 is a block diagram of a conventional image display system.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
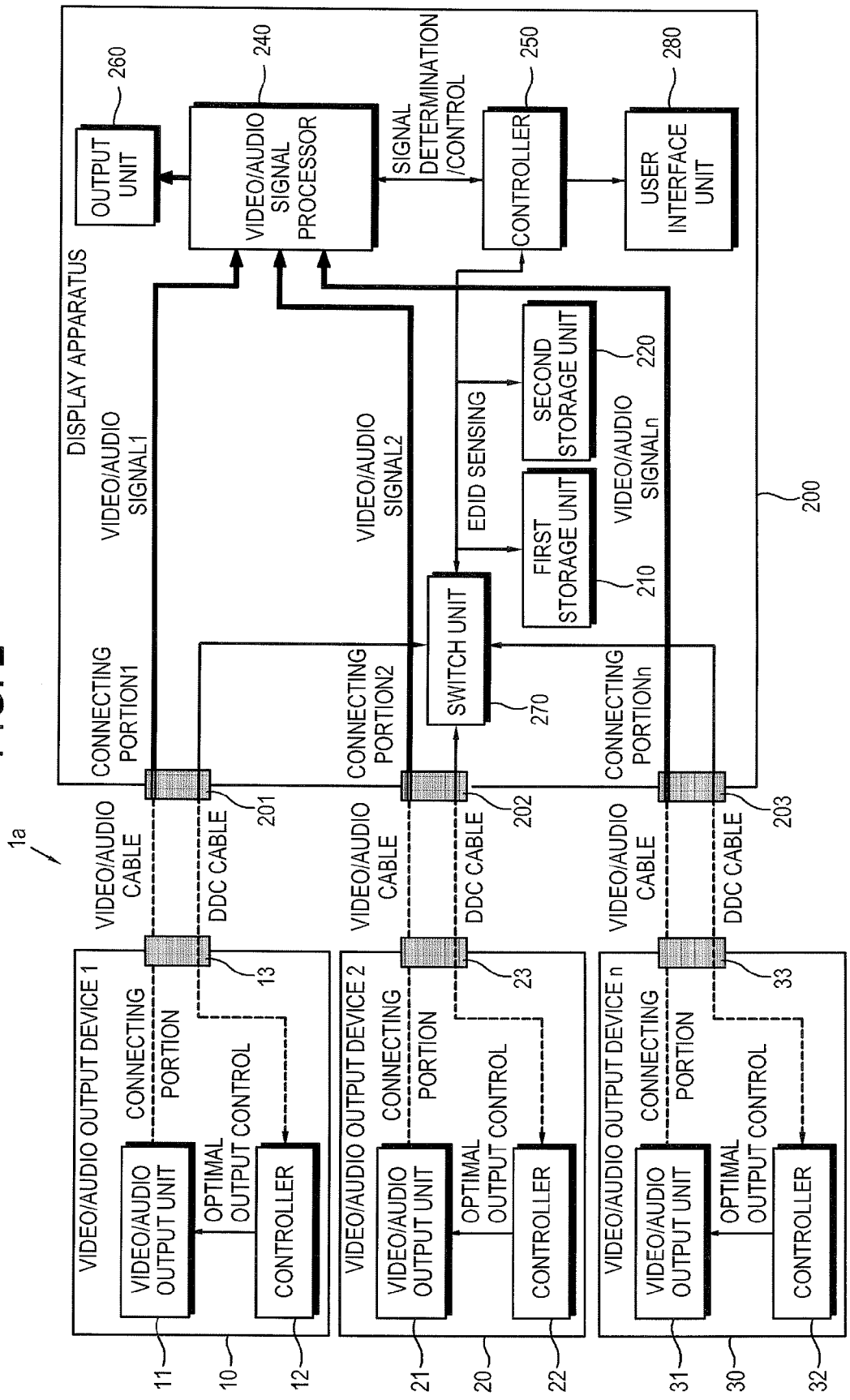
FIG. 2 is a block diagram of an image display system according to an exemplary embodiment of the present general inventive concept.

FIG. 2 is a block diagram of an image display system 1a according to an exemplary embodiment of the present general inventive concept.

Referring to FIG. 2, an image display system 1a according to an exemplary embodiment of the present general inventive concept includes video/audio output devices 10, 20, and 30 and a display apparatus 200. Here, the video/audio output devices 10, 20, and 30, such as a set-top box, DVD player, and PC, are apparatuses to provide source signals to the display apparatus 200. The display apparatus 200, such as TV and monitor, is an apparatus to practically output the source signals provided from the video/audio output devices 10, 20, and 30. The source signals may include a video signal and an audio signal.

The video/audio output devices 10, 20, and 30 and the display apparatus 200 are connected with each other through a predetermined cable. Here, the cable may be provided as a high definition multimedia interface (HDMI), a digital visual interface (DVI), or D-Sub cables, but it is not limited thereto.

The video/audio output devices 10, 20, and 30 and the display apparatus 200 each are equipped with connecting portions to allow communication of all signals including sources therebetween via a cable. In the embodiment of FIG. 1, connecting portions provided at the video/audio output devices 10, 20, and 30 are referred to as video/audio device-side connecting portions 13, 23 and 33, and connecting portions provided at the display apparatus 200 are referred to as display apparatus-side connecting portions 201, 202 and 203. However, the connecting portions are not limited to cable-connecting portions, and may include wireless connecting portions and the like.

The video/audio output devices 10, 20, and 30 include video/audio output units 11, 21, and 31, the video/audio output device-side connecting portions 13, 23, and 33, and video/audio output device-side controllers 12, 22, and 32.

The video/audio output units 11, 21, and 31 produce and send a source signal to be output through the display apparatus 200. The signal sent by the video/audio output units 11, 21, and 31 is transmitted to the display apparatus 200 through the video/audio output device-side connecting portions 13, 23, and 33.

The video/audio output device-side connecting portions 13, 23, and 33 support an interface between the video/audio output devices 10, 20, and 30 and the display apparatus 200. The video/audio output device-side connecting portions 13, 23, and 33 transmit the sent source signal by the video/audio output units 11, 21, and 31 to the display apparatus 200, and send EDID information stored in the display apparatus 200 to the video/audio output devices 10, 20, and 30 when the video/audio output devices 10, 20, and 30 are connected with the display apparatus 200 through a cable. Here, the EDID information includes monitor data information, which is IDs of a seller and producer, basic display variations and characteristics, or the like.

The video/audio output device-side controllers 12, 22, and 32 control the overall operations of the video/audio output devices 10, 20, and 30. In detail, the video/audio output device-side controllers 12, 22, and 32 control input and output of signals between the video/audio output units 11, 21, and 31 and the video/audio output device-side connecting portions 13, 23, and 33.

When a user inputs a request to send a source signal, the video/audio output device-side controllers 12, 22, and 32 control the video/audio output units 11, 21, and 31 to produce the source signal and transmit the produced source signal to the display apparatus 200 through the video/audio output device-side connecting portions 13, 23, and 33.

Further, when the video/audio output devices 10, 20, and 30 are connected with the display apparatus 200 through a cable, the video/audio output device-side controllers 12, 22, and 32 control the video/audio output device-side connecting portions 13, 23, and 33 to bring EDID information stored in the display apparatus 200 regardless of whether the display apparatus 200 is powered on or off. Accordingly, the video/audio output device-side controllers 12, 22, and 32 determine an optimal output condition of the display apparatus 200 to provide the EDID information to the video/audio output units 11, 21, and 31.

When the optimal output condition is determined by the video/audio output device-side controllers 12, 22, and 32, the video/audio output units 11, 21, and 31 produce and output a source signal in consideration of the determined optimal output condition.

The display apparatus 200 includes display apparatus-side connecting portions 201, 202, and 203, a video/audio signal processor 240, an output unit 260, a switch unit 270, a first storage unit 210, a second storage unit 220, a user interface unit 280, and a display apparatus-side controller 250.

The display apparatus-side connecting portions 201, 202, and 203 support an interconnection between the display apparatus 200 and the video/audio output devices 10, 20, and 30. For example, the display apparatus-side connecting portions 201, 202, and 203 are transmitted with a source signal from the video/audio output devices 10, 20, and 30 via a cable. Further, the display apparatus-side connecting portions 201, 202, and 203 transmit EDID information stored in the first storage unit 210 to the video/audio output devices 10, 20, and 30 through the cable.

The video/audio signal processor 240 is provided with a source signal transmitted from the video/audio output devices 10, 20, and 30 through the display apparatus-side connecting portions 201, 202, and 203, and decodes the source signal to be converted into a form outputable by the output unit 260. Meanwhile, the video/audio signal processor 240 analyzes source signals input from the respective connecting portions to provide to the controller 250 by determining whether the respective connecting portions are connected with the video/audio output devices.

The output unit 260 outputs the source signals processed by the video/audio signal processor 240. The source signals include video and audio signals, and thus the output unit 260 may include a video signal output unit, such as LCD and PDP, and an audio signal output unit, such as a speaker.

The switch unit 270 switches on and off to connect or disconnect the display apparatus-side connecting portions 201, 202, and 203 to and/or from the first storage unit 210. When being connected with the display apparatus 200 through a cable, the video/audio output devices 10, 20, and 30 take the EDID information of the display apparatus 200 regardless of whether the display apparatus 200 is powered on or off. Thus, the switch 270 connects one of the display apparatus-side connecting portions 201, 202, and 203 to the first storage unit 210.

The switch unit 270 releases the connection between the display apparatus-side connecting portions 201, 202, and 203 and the first storage unit 210 when it is input with a signal requesting to change EDID information from the controller 250. According to the modification process of EDID information, EDID information stored in the first storage unit 210 may be changed into the EDID information of another connecting portion stored in the second storage unit 220.

Further, the switch unit 270 reconnects one of the display apparatus-side connecting portions 201, 202, and 203 with the first storage unit 210 when completely modifying EDID information.

The first storage unit 210 stores EDID information to be provided to the video/audio output devices 10, 20, and 30. The EDID information stored in the first storage unit 210 is used by the video/audio output devices 10, 20, and 30 to sense the EDID information of the display apparatus 200, i.e., to grasp the output characteristics of the display apparatus 200, when the video/audio output devices 10, 20, and 30 and the display apparatus 200 are connected via a cable, and provided to the video/audio output devices 10, 20, and 30 regardless of whether the display apparatus 200 is powered on or off.

In the embodiment of FIG. 2, the first storage 210 stores only EDID information of one of the display apparatus-side connecting portions 201, 202, and 203, and the EDID information is provided to the video/audio output devices 10, 20, and 30 regardless of whether the display apparatus 200 is powered on or off. Thus, the first storage unit 210 is connected with one of the display apparatus-side connecting portions 201, 202, and 203 through the switch unit 270.

The second storage unit 220 stores all EDID information of the display apparatus-side connecting portions 201, 202, and 203. For example, if the display apparatus 200 is an apparatus to support HDMI, DVI, and D-sub standards, the second storage unit 220 stores all EDID information of connecting portions suitable with the above respective standards. That is, the second storage unit 220 may store a plurality of various EDID information.

The user interface unit 280 provides a list in a selectable form that lists which connecting portions of the display apparatus 200 are currently connected to the video/audio output devices 10, 20, and 30. The connecting portion list is provided to the user to choose a source to watch when a plurality of video/audio output devices 10, 20, and 30 are connected to the display apparatus 200, and displayed through the output unit 260.

When the user selects one connecting portion on the connecting portion list, the user interface unit 280 transmits a signal requesting to modify EDID information corresponding to the selected connecting portion to the display apparatus-side controller 250. The user interface unit 280 may include a remote controller (not illustrated) or a key input unit (not illustrated).

The display apparatus-side controller 250 controls the overall function of the display apparatus 200. In detail, the display apparatus-side controller 250 controls input and output of signals between the display apparatus-side connecting portions 201, 202, and 203, the video/audio signal processor 240, the output unit 260, the switch unit 270, the first storage unit 210, the second storage unit 220, and the user interface unit 280.

Further, when input with a signal requesting to change EDID information through the user interface unit 280, the display apparatus-side controller 250 changes the EDID information stored in the first storage unit 210 into the EDID information of another connecting portion stored in the second storage unit 220. Here, as the second storage unit 220 stores a plurality of EDID information, the display apparatus-side controller 250 changes the EDID information stored in the first storage unit 210 into the EDID information of a connecting portion corresponding to the signal requesting to change the EDID information.

Moreover, to change the EDID information stored in the first storage unit 210 into EDID information stored in the second storage unit 220, the display apparatus-side controller 250 controls the switch unit 270 to release the connection between the display apparatus-side connecting portions 201, 202, and 203 and the first storage unit 210. In this state, the video/audio output devices 10, 20, and 30 can not detect the EDID information of the display apparatus 200.

After the switch unit 270 releases the connection between the display apparatus-side connecting portions 201, 202, and 203 and the first storage unit 210, the display apparatus-side controller 250 reads out the EDID information of a connecting portion corresponding to a signal requesting to change EDID information from the second storage unit 220 and stores it in the first storage unit 210. Here, the EDID information previously stored in the first storage unit 210 is deleted.

After storing new EDID information in the first storage unit 210, the display apparatus-side controller 250 controls the switch unit 270 to reconnect the display apparatus-side connecting portions 201, 202, and 203 with the first storage unit 210. Accordingly, the video/audio output devices 10, 20, and 30 become capable of sensing the EDID information of the display apparatus 200.

Figure 3:
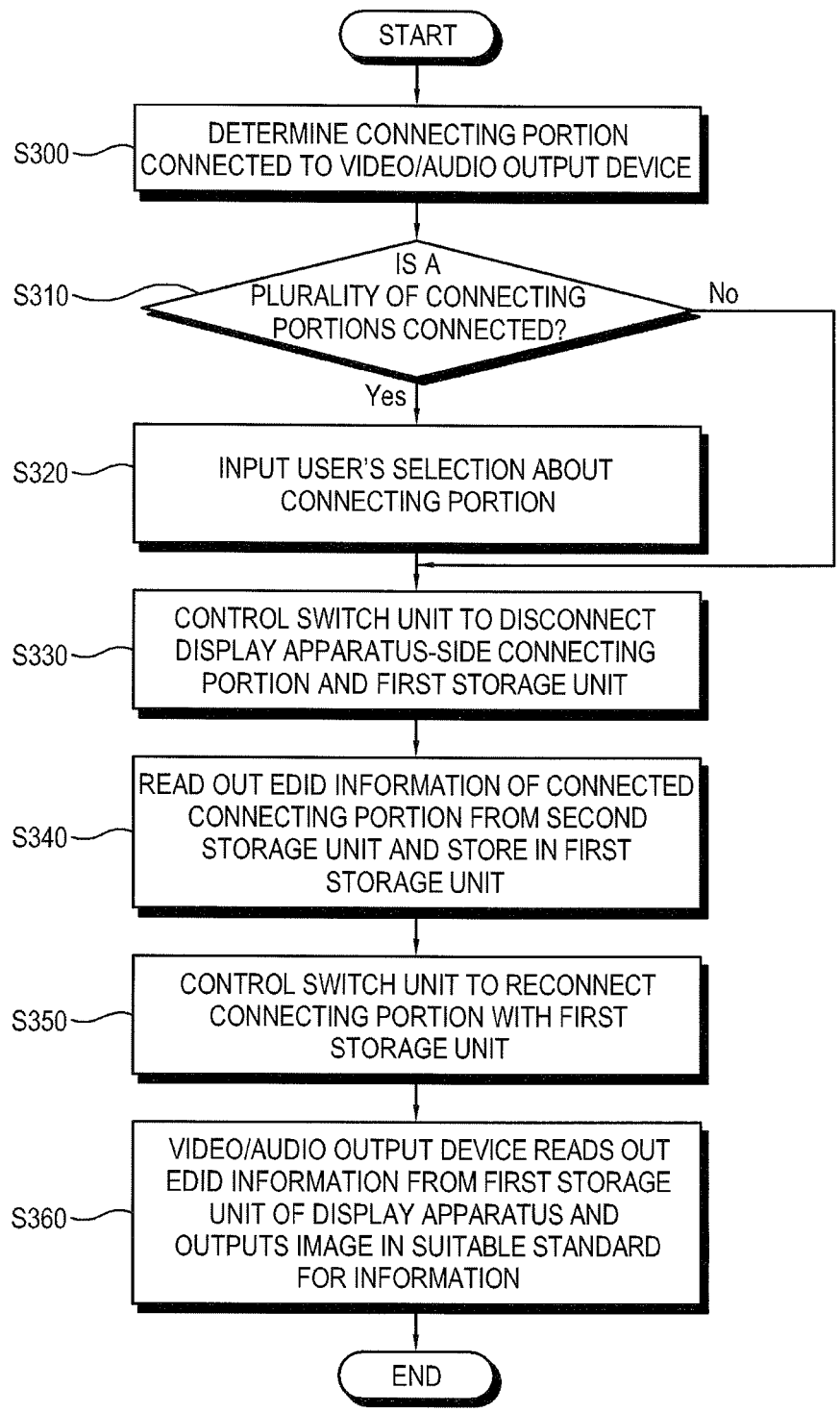
FIG. 3 is a flow chart to illustrate a method of changing EDID information in a display apparatus according to an exemplary embodiment of the present general inventive concept.

FIG. 3 is a flow chart to illustrate a method of changing the EDID information of the display apparatus according to an exemplary embodiment of the present general inventive concept.

In the following description, a method of changing EDID information in the display apparatus 200 according to an exemplary embodiment of the present general inventive concept will be described with reference to FIGS. 2 and 3. In the embodiment of FIGS. 2 and 3, the first storage unit 210 stores EDID information currently accessed, and the second storage unit 220 stores EDID information corresponding to a plurality of connecting portions including the EDID information stored in the first storage unit 210. Alternatively, the first storage 210 may not store any EDID information.

When a connecting portion connected to the video/audio output device is changed so that EDID information is required to be modified, the controller 250 determines whether a plurality of connecting portions are connected in operations S300 and S310. If a plurality of connecting portions are connected, the controller 250 is input with the user's selection of a connecting portion to be connected through the user interface unit 280 in operation S320. In this case, a connecting portion may be selected by the user in a relevant menu or a connecting portion list automatically displayed on a screen. Meanwhile, if a plurality of connecting portions are not connected at operation S310, operation S320 is omitted.

When a signal requesting to change EDID information is input from the controller 250, the switch unit 270 disconnects the display apparatus-side connecting portions 201, 202, and 203 from the first storage unit 210. Thus, the connection between the video/audio output devices 10, 20, and 30 and the display apparatus 200 is released in operation S330.

The display apparatus-side controller 250 reads out the EDID information of a connecting portion corresponding to the signal requesting to change EDID information from the second storage unit 220, and changes a pre-stored EDID information in the first storage unit 210 into the read-out EDID information from the second storage unit 220 in operation S340. Alternatively, if EDID information is not stored in the first storage unit 210, the controller 250 stores the EDID information of a connecting portion corresponding to the signal requesting to change the read-out EDID information from the second storage unit 220 in the first storage unit 210.

When the EDID information of the first storage unit 210 is changed into the EDID information selected by the user, the switch unit 270 reconnects the display apparatus-side connecting portions 201, 202, and 203 with the first storage unit 210. Accordingly, the video/audio output devices 10, 20, and 30 may sense the EDID information of the display apparatus 200 in operation S350.

Then, the video/audio output devices 10, 20, and 30 sense the EDID information having been changed and stored in the first storage unit 210. That is, when sensing the EDID information of the display apparatus 200, the video/audio output devices 10, 20, and 30 accesses the EDID information stored only in the first storage unit 210. Also when sensing the EDID information, the video/audio output devices 10, 20, and 30 output an image in a format corresponding to the EDID information to the display apparatus in operation S360.

As described above, the present general inventive concept provides a display apparatus and a method of changing the EDID information thereof, in which a non-volatile memory to store EDID information applicable to each of a plurality of connecting portions and a non-volatile memory to provide the EDID information to a video/audio output device are provided. Accordingly, a number of non-volatile memories can be reduced from a number equal to a plurality of corresponding connecting portions, to only two non-volatile memories in order to reduce material costs.

Further, a process to store EDID information in a non-volatile memory which was previously carried out as many times as the number of connecting portions is decreased to being performed once at the manufacturing process.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus connectable to a video/audio output device, comprising:
    at least two connecting portions to connect with the video/audio output device;
    a first storage unit to store extended display identification data (EDID) information to be provided to the video/audio output device;
    a second storage unit to store EDID information corresponding to the at least two connecting portions respectively; and
    a controller to change the EDID information stored in the first storage unit into another EDID information of a currently connected connecting portion from among the EDID information stored in the second storage unit when the connecting portion connected with the video/audio output device is changed.

2. The display apparatus according to claim 1, further comprising:
    a switch unit to selectively connect the at least two connecting portions to the first storage unit,
    wherein the switch unit disconnects the at least two connecting portions with the first storage unit when input with a signal requesting to change the EDID information from the controller, and reconnects the connecting portions with the first storage unit when the changing of the EDID information has been completed.

3. The display apparatus according to claim 1, wherein the at least two connecting portions comprises:
    a video/audio output device connection sensing switch unit, such that the controller senses an interface signal of the connection sensing switch unit coupled to the at least two connecting portions to determine a connecting portion connected to the video/audio output device.

4. The display apparatus according to claim 1, wherein the controller determines whether there are video signals of the at least two connecting portions to decide a connecting portion connected to the video/audio device.

5. The display apparatus according to claim 1, further comprising:
    a user interface to provide a list of connected connecting portions in a selectable form and to receive a connecting portion selection input signal from a user when at least two video/audio output devices are connected to the at least two connecting portions.

6. A method of changing extended display identification data (EDID) information of an display apparatus which comprises at least two connecting portions to connect with a video/audio output device, the method comprising:
    determining a connecting portion connected to the video/audio output device among two connecting portions; and
    changing the EDID information stored in a first storage unit and provided when connected with the video/audio output device into another EDID information corresponding to the connected connecting portion from among EDID information stored in a second storage unit and respectively corresponding to the two connecting portions.

7. The method according to claim 6, further comprising:
    disconnecting the connecting portion with the first storage unit before changing the EDID information; and
    reconnecting the connecting portion with the first storage unit after changing the EDID information.

8. The method according to claim 6, further comprising:
providing a list of connecting portions in a selectable form when at least two video/audio output devices are connected to the two connecting portions; and inputting user's selection about the connecting portions,
wherein the changing the EDID information is carried out by changing the EDID information stored in the first storage unit into the another EDID information of a connecting portion by the user's selection among EDID information stored in the second storage unit.

9. A display apparatus, comprising:
a plurality of connecting portions to connect with a video/audio output device;
a signal processor to process a video/audio signal input from the video/audio output device;
a first storage unit to store extended display identification data (EDID) information provided to the video/audio output device when the video/audio output device is connected with the connecting portions;
a second storage unit to store a plurality of EDID information respectively corresponding to the plurality of connecting portions; and
a controller to store EDID information corresponding to a connecting portion connected with the video/audio output device from among the plurality of EDID information of the second storage unit in the first storage unit when the video/audio output device is connected to one of the connecting portions.

10. An image display system including a display apparatus, comprising:
a plurality of video/audio output devices to selectively output video/audio signals to the display apparatus;
a plurality of connection portions to connect a respective one of the plurality of video/audio output devices to the display apparatus;
a first storage unit to store extended display identification data (EDID) information of one of the plurality of connecting portions, such that one of the respective video/audio output devices outputs the video/audio signals to the display apparatus;
a second storage unit to store EDID information of all of the plurality of connecting portions; and
a controller to change the EDID information stored in the first storage unit to another one of the EDID information stored in the second storage unit to selectively allow another one of the respective video/audio output devices to output the video/audio signals to the display apparatus.

11. The image display system of claim 10, further comprising:
a user interface unit to allow a user to select one of the plurality of connection portions from a list of the plurality of connection portions.

12. The image display system of claim 10, further comprising:
a switch to disconnect the plurality of connection portions from the display apparatus during the changing of the EDID information.

13. A method of changing extended display identification data (EDID) information of a display apparatus connected to a plurality of video/audio output devices via a plurality of respective connection portions, the method comprising:
storing EDID information of one of the plurality of connecting portions in a first storage unit, such that one of the respective video/audio output devices outputs the video/audio signals to the display apparatus;
storing EDID information of all of the plurality of connecting portions in a second storage unit;
changing the EDID information stored in the first storage unit to another one of the EDID information stored in the second storage unit based on a user's request to selectively allow another one of the respective video/audio output devices to output the video/audio signals to the display apparatus; and
outputting video/audio signals to the display apparatus based on the changed EDID information.

* * * * *